(12) United States Patent
MacGougan et al.

(10) Patent No.: US 9,535,163 B2
(45) Date of Patent: Jan. 3, 2017

(54) METHOD TO OPTIMIZE PROVIDING ASSISTANCE INFORMATION TO GPS

(71) Applicant: Apple Inc., Cupertino, CA (US)

(72) Inventors: Glenn D. MacGougan, San Jose, CA (US); Yefim Grosman, Sunnyvale, CA (US); Ronald Keryuan Huang, San Jose, CA (US); Robert W. Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 14/016,013

(22) Filed: Aug. 30, 2013

(65) Prior Publication Data

US 2014/0062773 A1    Mar. 6, 2014

Related U.S. Application Data

(60) Provisional application No. 61/695,979, filed on Aug. 31, 2012.

(51) Int. Cl.
| | |
|---|---|
| *G01S 19/45* | (2010.01) |
| *G01S 19/05* | (2010.01) |
| *G01S 19/25* | (2010.01) |
| *G01S 5/02* | (2010.01) |

(52) U.S. Cl.
CPC .............. *G01S 19/45* (2013.01); *G01S 5/0236* (2013.01); *G01S 19/05* (2013.01); *G01S 19/25* (2013.01)

(58) Field of Classification Search
CPC ........ G01S 19/45; G01S 5/0236; G01S 19/05; G01S 19/25

USPC ..................................................... 342/357.28
See application file for complete search history.

(56) References Cited

U.S. PATENT DOCUMENTS

| | | | |
|---|---|---|---|
| 2008/0085692 A1* | 4/2008 | Hart ...................... | H04W 16/20 455/187.1 |
| 2012/0059578 A1* | 3/2012 | Venkatraman ......... | G01C 21/20 701/411 |
| 2012/0146850 A1* | 6/2012 | Liu ......................... | G01S 19/34 342/357.42 |
| 2013/0170383 A1* | 7/2013 | Cho ....................... | G01S 5/0242 370/252 |

* cited by examiner

*Primary Examiner* — Frank J McGue
(74) *Attorney, Agent, or Firm* — Downey Brand LLP

(57) ABSTRACT

Methods and apparatus to provide assistance data for satellite navigation in a wireless communication device are disclosed. Processing circuitry in the wireless communication device determines whether to obtain assistance data for navigation based on a set of criteria. The set of criteria include one or more of a property of a geographic region in which the wireless communication device operates, a satellite signal quality estimate measured by the wireless communication device, and a user setting of the wireless communication device. When the set of criteria indicates that assistance data for navigation is beneficial for satellite navigation in the wireless communication device, the processing circuitry obtains one or more sets of assistance data. The processing circuitry configures operation of the wireless communication device for navigation based at least in part on the one or more sets of assistance data obtained.

19 Claims, 14 Drawing Sheets

110

Longitude Ranges

| | | LON a | LON b | LON c | LON d | LON e | LON f | LON g | LON h |
|---|---|---|---|---|---|---|---|---|---|
| | LAT A | 0 | 0 | 0 | 0 | 0 | 0 | 0 | 0 |
| | LAT B | 1 | 0 | 1 | 1 | 1 | 1 | 0 | 0 |
| Latitude Ranges | LAT C | 1 | 0 | 1 | 1 | 1 | 1 | 0 | 1 |
| | LAT D | 1 | 1 | 1 | 1 | 1 | 1 | 0 | 1 |
| | LAT E | 0 | 0 | 0 | 1 | 1 | 0 | 0 | 0 |

No Data Available → (points to a 0)
Data Available → (points to a 1)

Tile Set Representation
Of Data Availability

Longitude Ranges

|  | | LON a | LON b | LON c | LON d | LON e | LON f | LON g | LON h |
|---|---|---|---|---|---|---|---|---|---|
| Latitude Ranges | LAT A | 1000 | 900 | 850 | 800 | 800 | 825 | 810 | 800 |
|  | LAT B | 1100 | 1000 | 915 | 875 | 850 | 840 | 830 | 820 |
|  | LAT C | 1000 | 1000 | 1000 | 900 | 900 | 900 | 900 | 426 |
|  | LAT D | 1000 | 1000 | 1000 | 900 | 900 | 900 | 420 | 425 |
|  | LAT E | 1000 | 850 | 900 | 800 | 800 | 451 | 450 | 400 |

202 points to LAT A / LON a cell; 204 points to LAT E / LON h cell

Tile Set Representation Of
Bare-Earth Digital Elevation Model

FIG. 2

Tile Set Representation Of
First-return Digital Terrain Model

410

Longitude Ranges

| | LON a | LON b | LON c | LON d | LON e | LON f | LON g | LON h |
|---|---|---|---|---|---|---|---|---|
| LAT A | 1 | 1 | 0 | 0 | 0 | 1 | 1 | 1 |
| LAT B | 1 | 1 | 0 | 0 | 0 | 1 | 1 | 0 |
| LAT C | 1 | 0 | 0 | 0 | 0 | 0 | 0 | 0 |
| LAT D | 0 | 0 | 0 | 0 | 0 | 0 | 0 | 0 |
| LAT E | 0 | 0 | 0 | 0 | 0 | 0 | 0 | 0 |

Latitude Ranges (row labels)

Tile Set Representation Of
An Altitude Difference That Is Equal Or Greater
Than An Altitude Threshold

Longitude Ranges

| 502 | LON a | LON b | LON c | LON d | LON e | LON f | LON g | LON h |
|---|---|---|---|---|---|---|---|---|
| LAT A | 1 | 1 | 0 | 0 | 0 | 0 | 0 | 0 |
| LAT B | 1 | 1 | 0 | 0 | 0 | 0 | 0 | 0 |
| LAT C | 1 | 1 | 0 | 0 | 1 | 0 | 0 | 0 |
| LAT D | 0 | 0 | 0 | 0 | 0 | 0 | 1 | 0 |
| LAT E | 0 | 0 | 1 | 0 | 0 | 0 | 0 | 0 |

Latitude Ranges

Tile Set Representation Of WLAN AP Density Data
Equal Or Exceeding A Density Threshold

Longitude Ranges

| | | LON a | LON b | LON c | LON d | LON e | LON f | LON g | LON h |
|---|---|---|---|---|---|---|---|---|---|
| | LAT A | 1 | 1 | 0 | 0 | 0 | 0 | 0 | 0 |
| | LAT B | 1 | 1 | 0 | 0 | 0 | 0 | 0 | 0 |
| Latitude Ranges | LAT C | 1 | 0 | 0 | 0 | 0 | 0 | 0 | 0 |
| | LAT D | 0 | 0 | 0 | 0 | 0 | 0 | 0 | 0 |
| | LAT E | 0 | 0 | 0 | 0 | 0 | 0 | 0 | 0 |

Tile Set Representation Of
Dense Urban Areas

FIG. 6

METHOD TO OPTIMIZE PROVIDING ASSISTANCE INFORMATION TO GPS

CROSS-REFERENCE TO RELATED APPLICATIONS

This application claims the benefit of U.S. Provisional Application No. 61/695,979, filed Aug. 31, 2012 and entitled "METHOD TO OPTIMIZE PROVIDING ASSISTANCE INFORMATION TO GPS", which is incorporated by reference herein in its entirety for all purposes.

FIELD OF THE DESCRIBED EMBODIMENTS

The described embodiments relate generally to assisting navigation in a wireless communication device, and more particularly to modifying the operational state of the wireless communication device that uses a global positioning satellite system when additional assistance information should be provided to the wireless communication device.

BACKGROUND

Wireless communication devices continue to evolve to include features that supplement the functionality of a cellular telephone used to provide voice communication. Wireless communication devices can include not only voice, but also support text, provide Internet access, e.g. through a cellular wireless network or through a wireless local area network (WLAN), and offer navigation service capabilities. Many wireless communication devices include hardware modules and/or software modules to provide support for Global Navigation Satellite Systems (GNSS). The United States government provides a Global Positioning System that typically uses 31 satellites orbiting the Earth broadcasting specialized GPS signals in the 1.6 GHz range. Other global positioning systems such as the Russian GLONASS and the Chinese Beidou systems function in approximately the same manner. The term GNSS can be used to refer to satellite based positioning systems in general, and the terms GNSS and GPS can be used synonymously herein to indicate satellite based global positioning systems and signals without loss of generality.

Wireless communication device based GNSS systems can try to determine a position of the wireless communication device by receiving GNSS satellite signals. Oftentimes, the position of the wireless communication device can be presented to a user of the wireless communication device through a map displayed on the wireless communication device or on a display to which the wireless communication device is coupled. The wireless communication device can attempt to determine a position based on information obtained while in poor GNSS operating conditions, which can adversely affect the accuracy of position determination and information provided for map location display. GNSS signals are prone to fade, can suffer multipath or may be blocked by structural objects such as tunnels and/or tall buildings. When operating in a dense urban geographic region, a GNSS determined position of a wireless communication device can be less accurate than when operating in an open rural geographic region. During some operation conditions, a GPS module in the wireless communication device can benefit from additional assistance data. The additional assistance data can occupy additional memory in the wireless communication device or can vary with operating conditions, and thus a targeted set of assistance data for a particular wireless communication device can be preferred to a static set of assistance data loaded into any wireless communication device. In addition, downloading additional assistance data at all times to the wireless communication device can consume user memory or can require additional resources that, in some instances, can deplete a battery relatively quickly.

Therefore, what is desired is a reliable way to identify operating conditions when additional GNSS assistance data can be a benefit to the wireless communication device for determining an accurate location and/or to modify operating conditions of the wireless communication device.

SUMMARY OF THE DESCRIBED EMBODIMENTS

This paper describes various embodiments that relate to aiding a navigation system included in a wireless communication device.

Methods and apparatus to provide assistance data for satellite navigation in a wireless communication device are disclosed. Processing circuitry in the wireless communication device determines whether to obtain assistance data for navigation in the wireless communication device based on a set of criteria. In an embodiment, the set of criteria include one or more of a property of a geographic region in which the wireless communication device operates, a satellite signal quality estimate measured by the wireless communication device, and a user setting of the wireless communication device. When the set of criteria indicates that assistance data for navigation is required and/or can be beneficial for satellite navigation in the wireless communication device, the processing circuitry obtains one or more sets of assistance data. The processing circuitry configures operation of the wireless communication device for navigation based at least in part on the one or more sets of assistance data obtained.

The wireless communication device can obtain geographic data, global and/or regional, from local and/or remote storage. The geographic data can provide information about whether detailed information is available, and the detailed information can include bare-earth altitude models, first-return altitude models, altitude difference models, wireless local area network access point density information, geographic characterizations, and/or other information useful for determining properties and/or conditions of a geographic region in which the wireless communication device operates. When operating in a dense urban region, the processing circuitry can obtain and/or determine GPS assistance information to provide to a GPS module in the wireless communication device.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1B illustrates a graphical representation of a tile set of data availability information for a geographic area in accordance with some embodiments.

FIG. 2 illustrates a tile set representation of a bare-earth digital elevation model (DEM) for a geographic area in accordance with some embodiments.

FIG. 4B illustrates a tile set representation indicating when an altitude difference equals or exceeds an altitude threshold for a geographic area in accordance with some embodiments.

FIG. 5 illustrates a tile set representation indicating when a WLAN access point density in a geographic area equals or exceeds a density threshold in accordance with some embodiments.

FIG. 6 illustrates a tile set representation indicating dense urban areas for a geographic region in accordance with some embodiments.

DETAILED DESCRIPTION OF SELECTED EMBODIMENTS

Figure 1A:
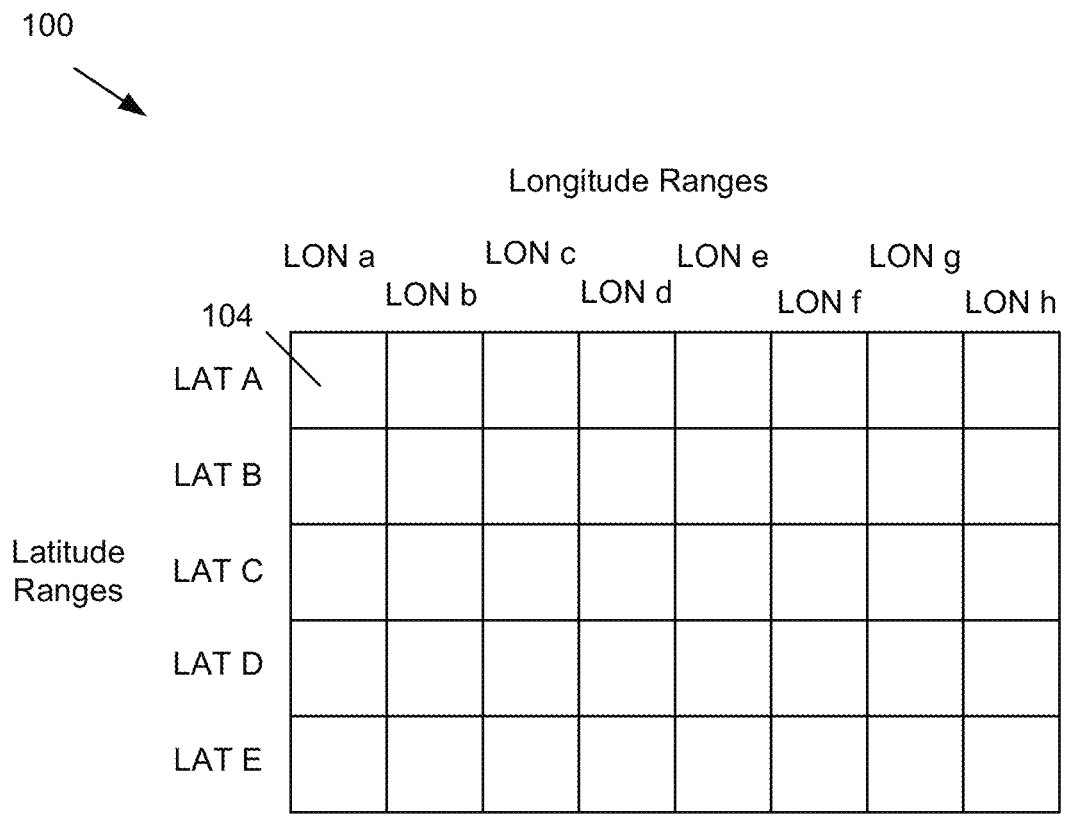
FIG. 1A illustrates a graphical representation of a tile set of information for a geographic area in accordance with some embodiments.

Wireless communication devices can include navigational capabilities, e.g., through the use of an embedded GPS module that can include a combination of hardware and/or software to determine locations and display maps and directions to a user of the wireless communication device. With limited memory storage available in the wireless communication device, a restricted set of geographic information can be available to determine and display location information. While access to external storage of additional geographic information that can provide assistance to the GPS module can be available, the wireless communication device can be configured to access the additional geographic information opportunistically to conserve transmit and receive operations that can require radio resources (bandwidth) and battery resources. Operation of the GPS module can also contribute to consumption of battery power at a rate higher than average in some circumstances. Rather than operate the GPS module at 100% duty cycle at all times, operation of the GPS module can be modified based on properties of a geographic location in which the wireless communication device operates (and also based on user preferences). The supplemental information to assist operation of the GPS module can be accessed under select circumstances. In an embodiment, a set of criteria can be used to determine when operating conditions of the wireless communication device may benefit from accessing additional geographic data that can aid operation of the GPS module in the wireless communication device. The set of criteria can include properties of the geographic area in which the wireless communication device operates. For example, when operating in a dense urban area, such as in a city that includes numerous tall buildings or other structures than can obstruct or interfere with reception of satellite signals used for GPS navigation, the GNSS signals can be blocked or can suffer from multi-path signals conditions. As GNSS signals are relatively weak in signal strength (e.g., received at levels of −160 dBW or lower), reception of GNSS signals in dense urban areas can prove especially challenging. Therefore, when the wireless communication device operates in a dense urban area, additional assistance data for a GNSS module can prove beneficial.

In some embodiments, properties of a geographic area can be determined based on geographic information available in "tiled" maps that model altitude information. A dense urban area can be determined using a combination of altitude models and wireless local area network (WLAN) density maps. In an embodiment, one or more tile sets can be used to efficiently convey altitude information and WLAN density information. In an embodiment, a tile set can correspond to a global region and can include data for a relatively large land area of the Earth's surface (e.g., a continent, a nation, a national region, etc.). A tile set can also correspond to a local region (at varying levels of density) and can include data covering a relatively small land area of the Earth's surface (a province, a state, a county, a city, a town, a set of city blocks, etc.). In one embodiment, a set of dense urban areas can be determined offline and stored on a remote server, and information regarding locations of dense urban areas can be sent to the wireless communication device. In another embodiment, dense urban area information can be provided to the wireless communication device organized in one or more global or regional tile sets. In some embodiments, dense urban areas can be determined at the wireless communication device based on information stored thereon and/or obtained from a remote server through a wireless network connection. Operation of the wireless communication device can be modified based on a determination of a type of geographic region in which the wireless communication device operates. In a representative embodiment, GPS assistance data can be obtained and/or derived by the wireless communication device and provided to a GPS module contained therein to assist in navigation. In some embodiments, operation of the GPS module can be modified based on a determination of the geographic area in which the wireless communication device operates.

FIG. 1A illustrates a graphical representation of a tile set 100 of information for a geographic area in accordance with some embodiments. Each tile in the tile set 100 can represent a geographic area covering a range of latitudes and a range of longitudes. The tile labeled 104 in the upper left corner of the tile set 100 can represent a geographic area bounded by the latitude range "A" and longitude range "a". For example, the latitude range "A" can correspond to latitude values between 40 degrees North (above the Equator) and 50 degrees North, while the longitude range "a" can correspond to longitude values between 110 degrees West (of the Meridian) and 120 degrees West. With this range of latitude and longitude values, the tile 104 can represent a geographic area of the surface of the Earth that includes the entire state of Idaho and portions of surrounding states of the USA and provinces of Canada as well. The coverage of the tile set 100 can depend on the values used for the latitude ranges and the longitude ranges. A global tile set can include tiles that represent a significant percentage or the entirety of the Earth's surface. For example, global latitude ranges can span 180 degrees West to 180 degrees East of the Meridian, while global longitude ranges can span from 90 degrees North (above the Equator) to 90 degrees South (below the equator). In some embodiments, the "global" tile set can exclude sparsely populated regions, e.g., Antarctica, Northernmost Arctic regions, and open areas of ocean. In another embodiment, the tile set 100 can represent a local geographic region of information, which can range from a continent, a nation, a state/province, a county, a city, a set of city blocks, etc. The latitude ranges and the longitude ranges can be more limited in the scope of geographic area covered, and therefore the resulting tile set 100 can provide data for a limited geographic area. For example, the longitude ranges for the entire tile set 100 can be limited to a region that covers from 20 degrees North to 22 degrees North above the equator, and the latitude ranges can be limited values between 30 degrees East and 32 degrees East of the Meridian. In some embodiments, the set of tiles represent contiguous regions, while in some embodiments, the set of tiles can represent disconnected regions, e.g., an island chain.

In some embodiments, the latitude ranges and the longitude ranges can be evenly divided into equally spaced ranges. For example, the longitude range of the tile set 100 can be divided into eight longitude ranges labeled as LON "a" to LON "h", each longitude range spanning an equal number of degrees. Similarly, the latitude range of the tile set 100 can be divided into a number of equally spaced ranges. For example, the latitude range of the tile set 100 can be divided into five latitude ranges labeled as LAT "A" to LAT "E". The tile set 100 can include an arbitrary number of latitude ranges and longitude ranges to cover a particular contiguous and/or noncontiguous region. Each tile in the tile set 100 can represent a surface area bounded by a latitude range and a longitude range.

FIG. 1B illustrates a graphical representation of a tile set 110 that provides data availability information for a set of geographic areas in accordance with some embodiments. As described for the tile set 100 of FIG. 1A, each of the tiles in the tile set 110 can represent a geographic area spanned by a range of latitudes and a range of longitudes. The tile set 110 can provide a binary indication of whether additional data information, e.g., geographic data that can assist with GPS functions of the wireless communication device, is available. A first binary value of "0" in a tile of the tile set 110 can indicate that no data is available for the geographic area bounded by particular longitude and latitude values, while a second binary value of "1" can indicate that data is available for the set of longitude and latitude values for a corresponding tile of the tile set 110. In some embodiments, the wireless communication device can include data availability tile sets locally stored and can retrieve more detailed data information for one or more tiles based on the indication of the data availability as provided in the data availability tile set 110. In some embodiments, the wireless communication device downloads dynamically the data availability tile set that can correspond to an area in which the wireless communication device presently operates.

FIG. 2 illustrates a tile set 200 representation of a bare-earth digital elevation model (DEM) for a geographic area in accordance with some embodiments. Each tile in the tile set 200 can represent a geographic area bound by a range of longitude values and a range of latitude values. For the tile set 200, each tile can store information referred to as "bare-earth" data. In an embodiment, bare-earth data can include elevation (altitude) data for the surface of the Earth in a particular geographic region represented by the tile. In some embodiments, each tile contains a single value of bare-earth data. In some embodiments, each tile contains a set of values of bare-earth data. Depending on the range of latitude values and the range of longitude values defined by the tile set 200, the precision of the bare-earth DEM data contained in each tile of the tile set 200 can be made arbitrarily precise with respect to a particular geographic area. Thus, for example, a tile in the tile set 200 can represent multiple square miles, a single square mile, or 100 square feet. Each tile in the tile set 200 can include a "bare earth" altitude value for the surface of the Earth covered by particular region specified by the range of latitudes and range of latitudes for the tile. In some embodiments, the altitude value in the tile can represent an average or median value for the geographic area covered by the tile. In the exemplary tile set 200, tiles can include altitude values ranging from a high point of 1100 (feet or meters or another appropriate metric) in tile 202, which covers a range of longitudes LON "a" and a range of latitudes LAT "B" to a low point of 400 (feet or meters) in tile 204, which covers a range of longitudes LON "h" and a range of latitudes LAT "E". Information in "bare-earth" tile sets, as exemplified by tile set 200, can be used as a baseline surface value above which structures (e.g., buildings) or other radio frequency reflective elements (e.g., forests) can extend. The "bare-earth" tile sets can provide a form of topographical mapping for a geographic region.

Figure 3:
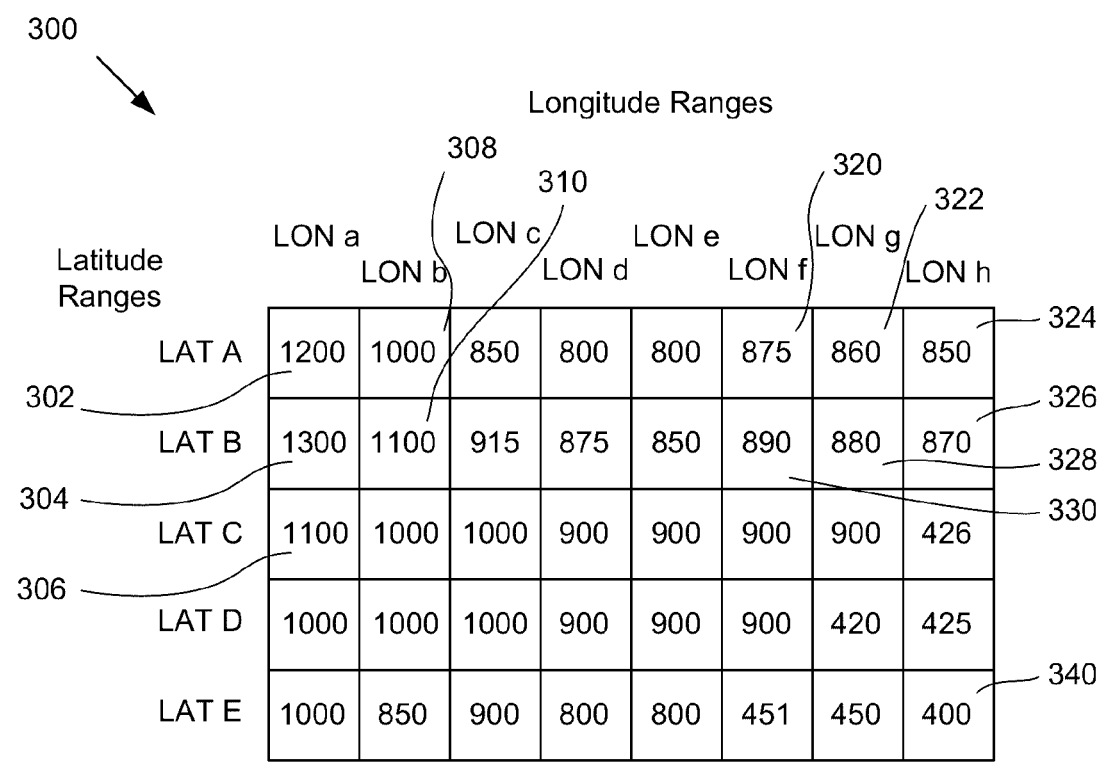
FIG. 3 illustrates a tile set representation of a first return digital terrain model (DTM) for a geographic area in accordance with some embodiments.

FIG. 3 illustrates a tile set 300 representation of a "first return" digital terrain model (DTM) for a geographic area in accordance with some embodiments. First return information can be gathered by aircraft or satellites and can be made available to wireless communication devices for use with navigation systems. In some instances, a radio frequency (or other measureable) signal can be sent from a satellite and/or an aircraft, and a reflected signal can be measured at the signal source, the reflected signal returning from a first object that the radio frequency signal encounters. Thus, the reflected signal can provide information about an altitude of objects situated above the surface of the earth. Representative information that can be included in first-return data can include the altitude of buildings in a geographic area (e.g., in an urban area) or the height of trees of a forest (e.g., in a rural area).

The first return data illustrated by tile set 300 contains altitude values that range from a high point of 1300 units (feet, meters, or other metric) in the tile 304 that represents a range of longitudes LON "a" and a range of latitudes LAT "B" to a low point of 400 units in the tile 340 that represents a range of longitude values LON "h" and a range of latitude values LAT "E". Other tiles 302, 304, 306, 308 and 310 in the tile set 300 indicate a "first return" altitude value that exceeds a corresponding "bare earth" altitude value for an equivalent tile in tile set 200 (assuming both tile sets 200 and 300 use the same longitude ranges and latitude ranges). A higher "first return" altitude value in a tile can indicate the presence of a structure or other object in the associated geographic area bounded by the range of longitude values and latitude values for the tile. Similarly, tiles 320, 322, 324, 326, 328 and 330 in the tile set 300 can also indicate the presence of one or more structures or objects located in their respective geographic areas when comparing the "first return" values for the tiles to the corresponding "bare earth" values.

Figure 4A:
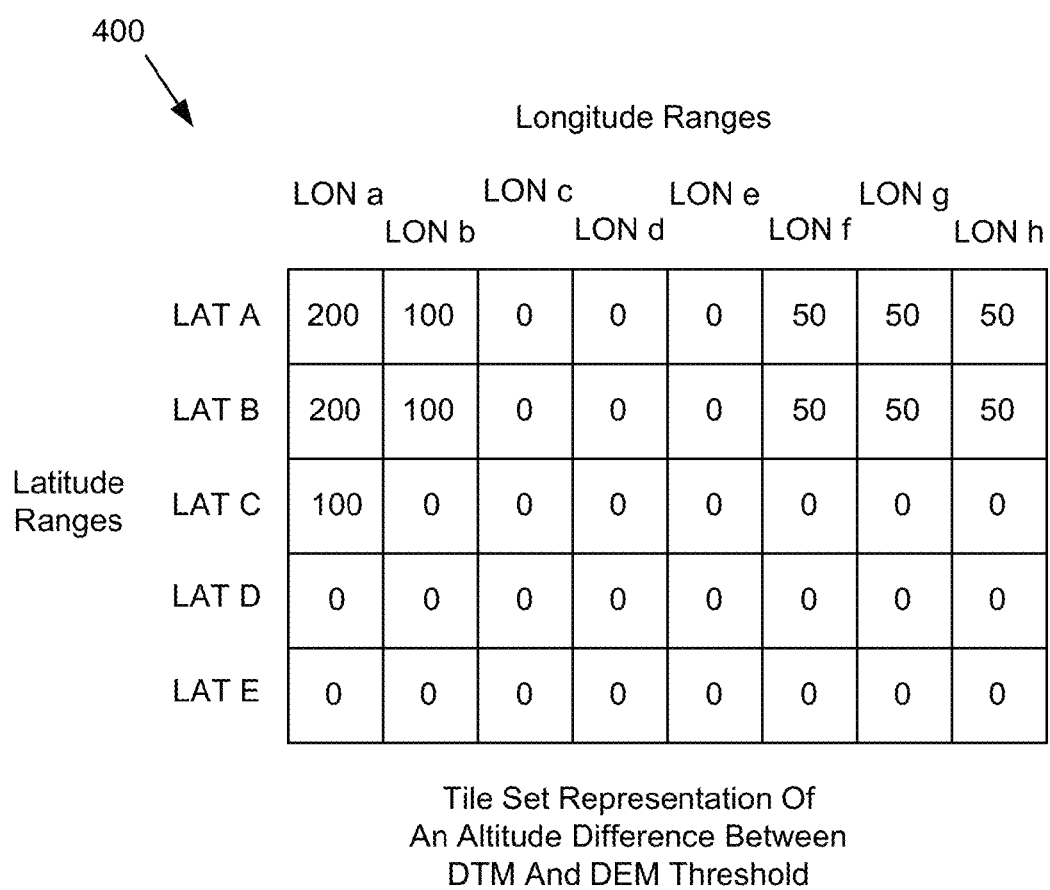
FIG. 4A illustrates a tile set representation indicating altitude differences between first-return altitudes and bare-earth altitudes for a geographic area in accordance with some embodiments.

An altitude difference between the first-return DTM values of tile set 300 and the bare-earth DEM values of tile set 200 can also be presented in a tile set, e.g., as illustrated by tile set 400 in FIG. 4A. FIG. 4A illustrates a tile set 400 representation indicating altitude differences between first-return altitudes and bare-earth altitudes for a geographic area in accordance with some embodiments. Each tile in tile set 400 includes a calculated difference between a first return value for a corresponding tile in tile set 300 and a bare earth value for a corresponding tile in tile set 200. FIG. 4A includes two distinct sets of tiles that can represent geographic areas in which structures or other radio frequency reflective objects are located. When operating in a tile that contains a non-zero altitude difference (or an altitude difference that equals or exceeds an altitude threshold), the wireless communication device can determine whether additional GPS assistance information can be beneficial. FIG. 4B illustrates a tile set 410 that indicates when an altitude difference equals or exceeds an altitude threshold for a geographic area in accordance with some embodiments. The tile set 410 can provide a simplified "binary" representation of altitude differences for geographic areas covered by the tiles of the tile set 410. In an embodiment, a "1" value in a tile can indicate when can altitude difference between the first-return altitude value and the bare-earth altitude value equals or exceeds an altitude threshold or predetermined amount. For example, if the altitude difference between the first-return altitude value and the bare-earth altitude value equals or exceeds 30 units, then a "1" value can be entered into a tile; otherwise, a "0" value can be entered into the tile. As illustrated in this example, the tiles of the tile set 410 that include a "1" value can be associated with geographic areas that have a structure or other object greater than 30 feet tall. The binary representation for altitude difference values used for FIG. 4B can simplify computation, e.g., when determining a geographic region type (and can provide for more efficient storage of altitude difference information. In some embodiments, tiles can include more precise altitude difference values, e.g., as shown for tile set 400. In some embodiments, the wireless communication device can access altitude difference information for one or more geographic areas in which the wireless communication device operates, e.g., by accessing local and/or remote storage. In some embodiments, the wireless communication device obtains bare earth information and first return information and calculates altitude difference information therefrom.

FIG. 5 illustrates a tile set 500 that provides information that indicates when a wireless local area network (WLAN) access point (AP) density in a geographic area equals or exceeds a density threshold in accordance with some embodiments. In some embodiments, FIG. 5 can represent a Wi-Fi density in a set of geographic regions. In some embodiments, FIG. 5 can provide a simplified binary representation of WLAN AP density. For example, when more than "N" WLAN access points are determined to be within an area covering M square feet, then a "1" value can be entered into the corresponding tile, otherwise a "0" value can be entered in the tile. In this way, a density of WLAN access points can be efficiently described for a geographic region. In another embodiment, an actual count of WLAN access points (or a quantized value thereof) can be included in each tile in the tile set 500. For example, when WLAN access points are determined to exist within a region bounded by the latitude range LAT "A" and the longitude range LON "a", then a value of 500 can be entered into tile 502 of the tile set 500. In some embodiments, values entered in the tiles of tile set 500 can represent a density of WLAN access points (e.g., X WLAN access points per area unit).

In an embodiment, a geographic type for a region can be determined based on information obtained from altitude difference tile sets and/or WLAN access point density tile sets. A geographic region can be determined to be a "dense urban" area based on a combination of data from the altitude differences between the bare earth altitudes and the first-return altitudes shown in tile sets 400 and/or 410 of FIGS. 4A/4B, and the WLAN access point density information shown in the tile set 500 in FIG. 5. The presence of a relatively higher density of WLAN access points can indicate a concentration of people. By combining the WLAN access point density data from tile set 500 with the altitude difference data from tile sets 400 and/or 410, a determination that a specific geographic area is a dense urban region can be made. The altitude difference information in combination with a higher WLAN access point density can indicate the presence of tall buildings frequently found in dense urban area such as downtown areas of cities. In contrast, a higher altitude difference value in an a geographic area having a relatively lower WLAN access point density can indicate the presence of tall objects such as a forest of trees, i.e., a dense rural area. In some embodiments, a relatively low altitude difference value and a relatively high WLAN access point density value can indicate an open urban (or suburban) area, while a relatively low altitude difference value and a relatively low WLAN access point density value can indicate an open rural area.

FIG. 6 illustrates a tile set 600 that represents an indication of dense urban areas for a geographic region in accordance with some embodiments. In one embodiment, for each tile in the tile set 600, a value can be determined by a logical "AND" operation of the value contained in the corresponding tile of the tile set 500 (binary representation of WLAN access point density relative to a density threshold) and the value contained in the corresponding tile of the tile set 410 (binary representation of altitude difference relative to an altitude threshold). In this example, a "1" value in a tile of the tile set 600 can indicate a dense urban area, while a "0" value in a tile of the tile set 600 can indicate other than a dense urban area. Dense urban areas can be present difficult operating conditions for a GPS module in the wireless communication device. If the wireless communication device can determine that it is operating in a dense urban geographic area, then the wireless communication device can modify one or more operations. In one embodiment, the wireless communication device can use information contained in tile set 600 to determine when the wireless communication device operates in a dense urban area.

In some embodiments, the wireless communication device can download additional GPS assistance information when the wireless communication device operates in a dense urban area. In some embodiments, the wireless communication device can enable one or more sensors in the wireless communication device to provide additional information, e.g., an accelerometer and/or a gyroscope included within the wireless communication device to aid navigation by the GPS module while in dense urban areas. In another embodiment, when the wireless communication device operates in a dense urban area, the GPS module can be configured to operate differently than when the wireless communication device is not in a dense urban area. For example, circuitry of the GPS module can operate with different duty cycles when the wireless communication device is operating in different geographic type areas. In some cases (such as open rural areas), the GPS module circuitry can operate using a more limited duty cycle (e.g., a 10% duty cycle) to conserve battery power. As dense urban areas can prove more difficult to operate within, the GPS module circuitry can operate using a high duty cycle (e.g. up to a 100% duty cycle) to provide greater GPS navigation accuracy.

In some embodiments, the wireless communication device can include a combination of hardware and software processing circuitry to display map information to the user. In some embodiments, the processing circuitry can determine a tolerance for mapping GPS location estimates to map features, e.g., aligning a displayed map position to a road or other map feature. In some embodiments, the tolerance values used for mapping the GPS location estimates to the map features can vary based on a determination of a geographic type of region in which the wireless communication device operates. As dense urban areas can cause GPS based location estimates to be less accurate, a map matching tolerance can be increased to a wider range of values when the wireless communication device operates in a dense urban area. For example, a first tolerance for map matching of 20 feet can be used to align a displayed position of the wireless communication device to a map feature (e.g., a road) when operating in an open area, while a wider tolerance value of 30 feet can be used when operating in a dense urban area. The wider tolerance value can allow for higher position deviations to occur, while still displaying a map position to a user of the wireless communication device aligned with a map feature, such as a road.

Figure 7:
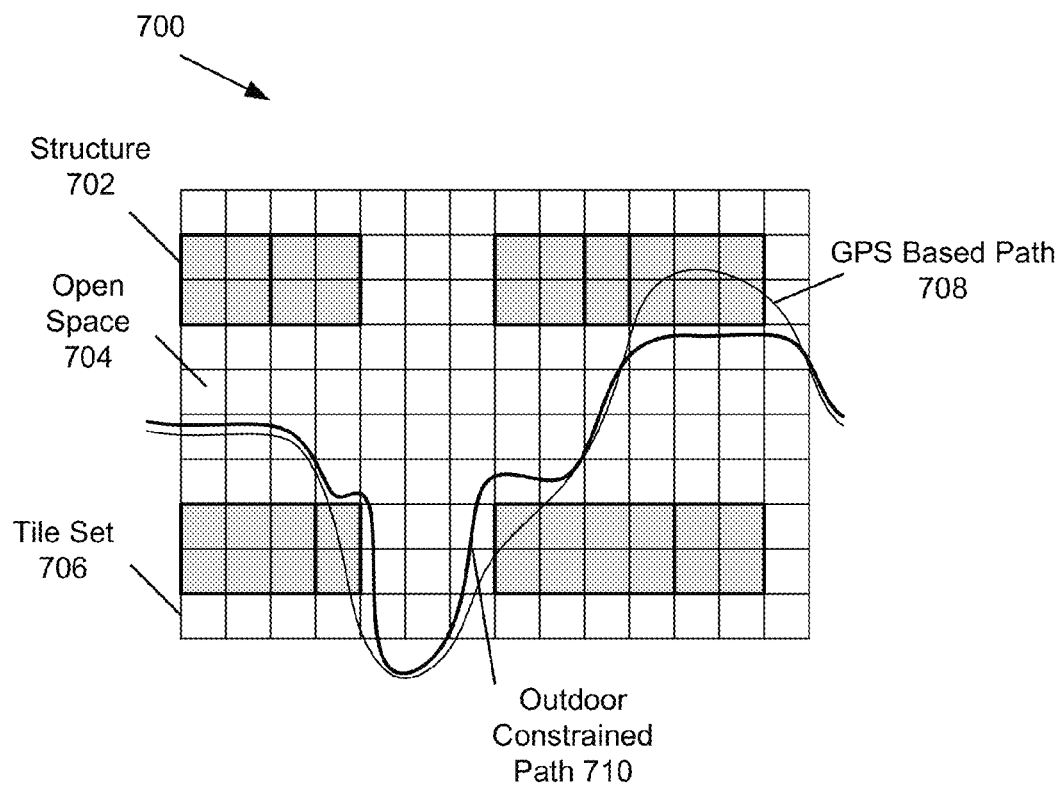
FIG. 7 illustrates a representative GPS based path estimate with and without constraints applied in accordance with some embodiments.

FIG. 7 illustrates a diagram 700 of a representative GPS based path estimate 708 with and without constraints applied in accordance with some embodiments. A tile set 706 can represent a geographic area covering several blocks of buildings and bisecting roads. The tile set 706 can include altitude difference information (or other characterizing information) that can differentiate closed structures 702, e.g., buildings, from open space 704. In some embodiments, the tile set 706 can indicate an outdoor environment (e.g., open space 704) versus an indoor environment (e.g., building 702). The wireless communication device can use information in the tile set 706 to determine whether the wireless communication device is operating indoors or outdoors. In some embodiments, the wireless communication device can determine that it is operating in an outdoor environment, e.g., open space 704, and a display of location information for positions of the wireless communication device to a user of the wireless communication device can be adjusted based on the determination of the location of the wireless communication device in the outdoor environment. For example, a "raw" GPS based path 708, which can include position estimates that traverse closed areas, such as one or more buildings 702, can be adjusted when displayed to the user to an "outdoor constrained" path 710.

Figure 8:
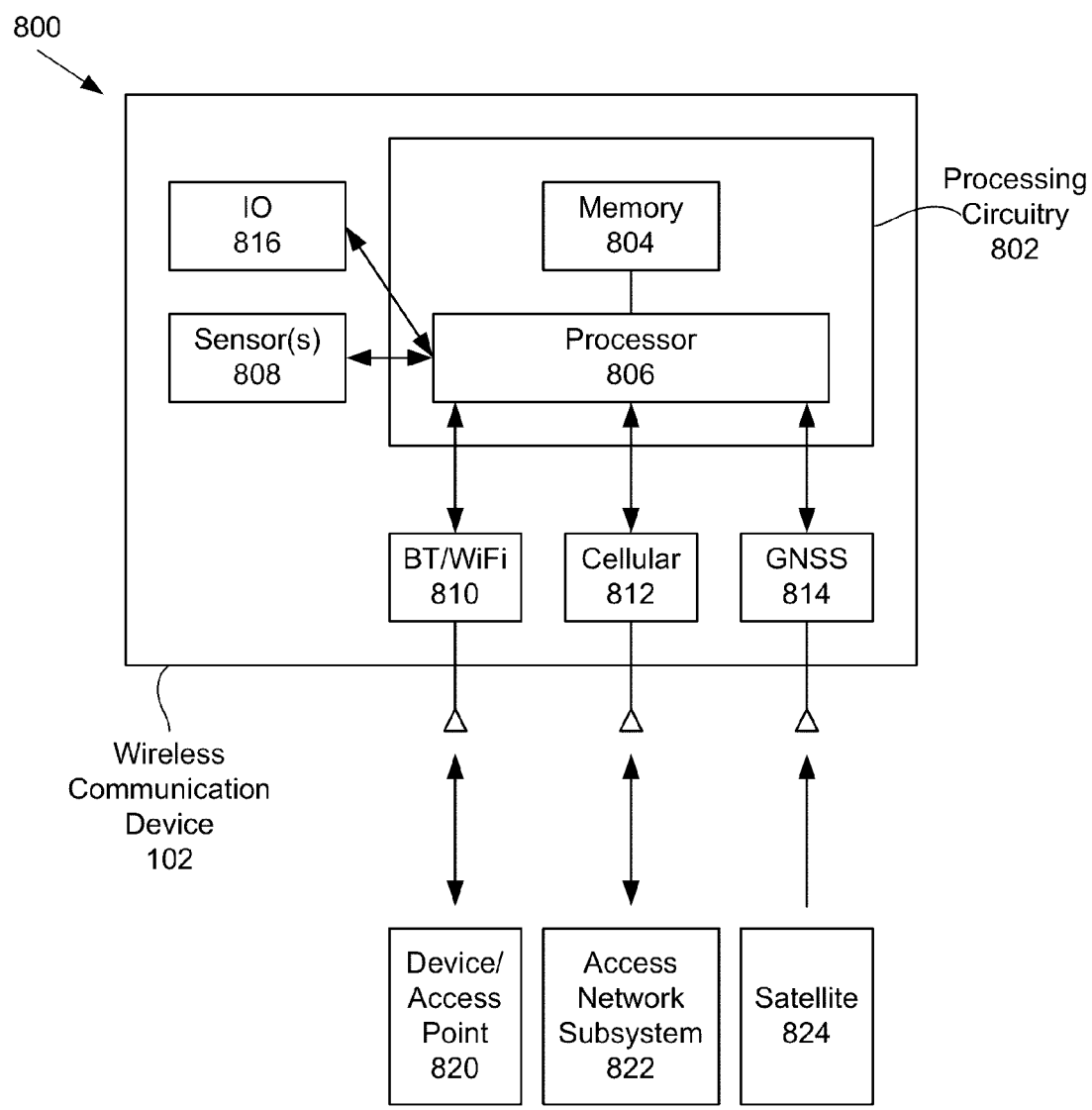
FIG. 8 illustrates a representative set of processing modules of a wireless communication device in accordance with some embodiments.

FIG. 8 illustrates a diagram 800 of a representative set of processing modules of a wireless communication device 102 in accordance with some embodiments. The wireless communication device 102 can include processing circuitry 802 that can execute program code stored in memory 804 using a processor 806 (or multiple processors) to control the wireless communication device 102. The processing circuitry 802 can also receive input from one or more sensors 808 contained in (and/or coupled to) the wireless communication device 102. Sensors 808 can include accelerometers, gyroscopes, or other motion sensors, from which information can be obtained to supplement GPS position estimates. In some embodiments, the processor 806 determines a set of estimated positions of the wireless communication device 102 to provide on a display (e.g., input/output (IO) module, as indicated by IO 816), e.g., as part of navigation, mapping, or other programs, to a user of the wireless communication device 102. In some embodiments, the IO 816 module can perform as a combination of a display to present information to a user of the wireless communication device 102 and an input entry subsystem through which the user can provide information, e.g., setting values. In some embodiments, the processor 806 determines positions based on a set of GPS estimates, a set of sensor data, and a set of map vector data (e.g., obtained from memory 804). The wireless communication device 102 can include a set of one or more wireless circuitry modules, e.g., a GNSS (or equivalently GPS) module 814, a cellular wireless circuitry module 812, and a wireless local/personal area networking (Bluetooth/WiFi) module 810. The processing circuitry 802 can interact with the wireless circuitry to transmit and receive wireless signals according to various wireless communication protocols. A wireless circuitry module (also referred to as a wireless subsystem) of the wireless communication device 102 can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments. In some embodiments, the processor 806 can determine position information based on signals received from one or more access points 820, one or more other nearby devices 820, one or more access network subsystems 822 associated with cellular wireless networks, and one or more satellites 824. In some embodiments, the processor 806 can prioritize information based on an estimate of accuracy of the information provided to determine position estimates, e.g., using GPS estimates in open areas with a high number of visible satellites with relatively strong received signals, and using cellular radio tower and/or access point data and/or sensor data in combination with map vector data when the wireless communication device 102 is located in areas of minimal or no GPS coverage (e.g., in or among GPS blocking structures). In some embodiments, the processing circuitry 802 can determine a type of geographic region in which the wireless communication device 102 operates. In some embodiments, the processing circuitry 802 can obtain GPS assistance information from local storage, e.g., memory 804, and/or from remote storage, e.g., through a wireless connection using one or more sets of wireless circuitry in the wireless communication device 102. In some embodiments, the processing circuitry 802 can determine when to retrieve (and/or determine) additional GPS assistance information to supplement information provided by the GPS module 814. In some embodiments, the processing circuitry 802 provides supplemental GPS assistance data to the GPS module 814 and/or changes operating conditions of the GPS module 814 based on a determination of a geographic region type in which the wireless communication device 102 operates.

Figure 9:
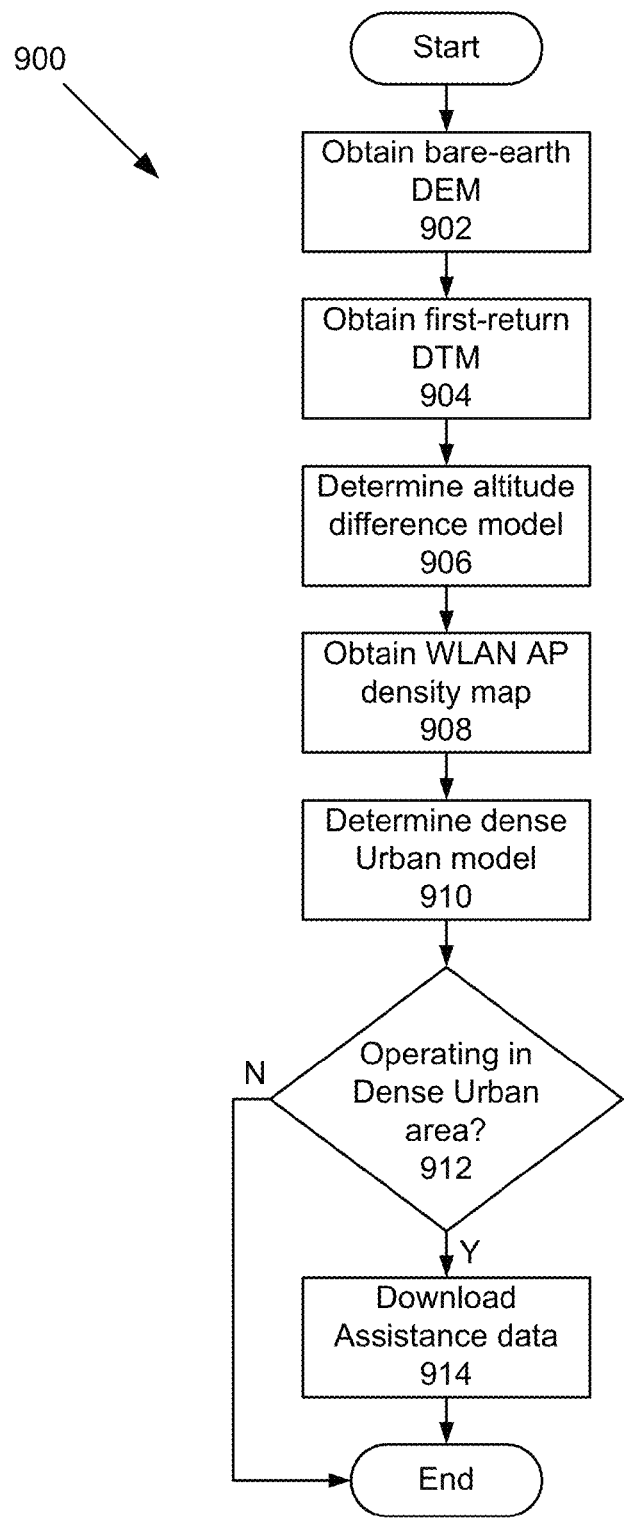
FIG. 9 illustrates a representative method for determining when additional assistance data can be downloaded to a wireless communication device in accordance with some embodiments.

FIG. 9 illustrates a representative method 900 for determining when additional assistance data can be downloaded to a wireless communication device 102 in accordance with some embodiments. The method illustrated in FIG. 9 provides an example of a set of actions that can occur when the wireless communication device 102 determines that it is currently operating in a dense urban area. In step 902, processing circuitry 802 in the wireless communication device 102 obtains bare-earth DEM information. In one embodiment, the bare-earth DEM information can be provided in the form of a tile set 200 (or an equivalent) as shown in FIG. 2. In step 904, processing circuitry 802 in the wireless communication device 102 obtains first return altitude information. In one embodiment, the first-return altitude information can be provided in the form of a tile set 300 as shown in FIG. 3. In step 906, processing circuitry 802 in the wireless communication device 102 determines an altitude difference model. In one embodiment, the altitude difference information includes a difference in altitude values between a set of first-return data and a set of bare-earth data. In an embodiment, the altitude difference information can be provided in the form of a tile set 400/410 as illustrated in FIG. 4A and FIG. 4B respectively. In step 908, a WLAN access point density map can be obtained. In one embodiment, the WLAN access point density map can be provided in the form of a tile set 500 as illustrated in FIG. 5. In step 910, a set of one or more dense urban areas can be determined. In an embodiment, the dense urban areas can be presented in the form of a tile set 600 as shown in FIG. 6. In step 912, processing circuitry 802 in the wireless communication device 102 can determine whether the wireless communication device 102 currently operates in a dense urban area. When the wireless communication device 102 is not operating in a dense urban area, then the method 900 can end. When the wireless communication device 102 operates in a dense urban area, then in step 914, GPS assistance data can be downloaded to assist the GPS module 914 of the wireless communication device 102 and/or the processing circuitry 802 in providing GPS location estimates and/or determining map information to display to a user of the wireless communication device 102.

Figure 10:
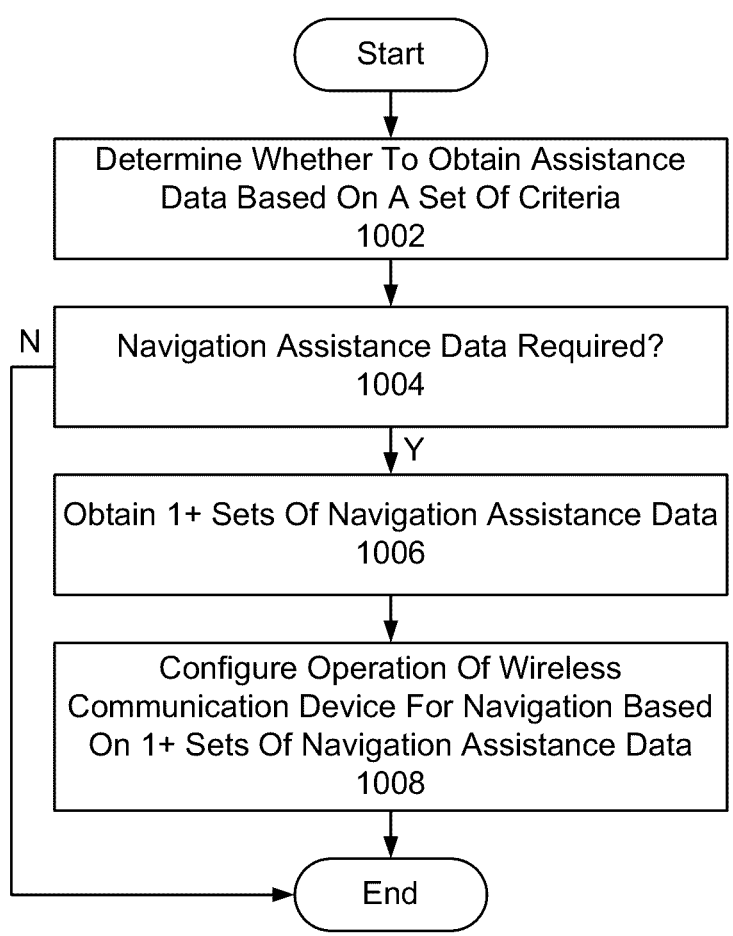
FIG. 10 illustrates a representative method for providing assistance data to a satellite navigation system in a wireless communication device in accordance with some embodiments.

FIG. 10 illustrates a representative method 1000 for providing assistance data to a satellite navigation system 814 in a wireless communication device 102 in accordance with some embodiments. In step 1002, processing circuitry 802 in the wireless communication device 102 determines whether to obtain assistance data for navigation in the wireless communication device 102 based on a set of criteria. In some embodiments, the set of criteria includes one or more of: a property of a geographic location of the wireless communication device 102, a satellite signal quality estimate measured by the wireless communication device 102, and a user setting of the wireless communication device 102. In some embodiments, the property of the geographic location of the wireless communication device 102 is determined to be one of: an open rural region, a dense rural region, a dense urban region, and an open suburban region. In some embodiments, the geographic location property is determined based on bare-earth altitude information, first-return altitude information, altitude different information, wireless local area network access point density information, cellular tower density information, map feature data, or other geographic and signal density information available to the wireless communication device 102. In step 1004, the processing circuitry 802 of the wireless communication device 102 determines whether the set of criteria indicates navigation assistance data is required by (and/or can be beneficial to operation of) the wireless communication device 102, e.g., for GPS navigation. When the processing circuitry 802 determines that navigation assistance data is not required, the method 1000 can end. When the processing circuitry 802 determines that navigation assistance data is required, then in step 1006, the processing circuitry 802 of the wireless communication device 102 can obtain one or more sets of navigation assistance data. In some embodiments, the processing circuitry 802 obtains at least a portion of the navigation assistance data from an internal storage (e.g., a memory 804). In some embodiments, the processing circuitry 802 obtains at least a portion of the navigation assistance data form an external storage, e.g., through a wireless connection using the wireless circuitry of the wireless communication device 102. In step 1008, the processing circuitry 802 of the wireless communication device 102 configures operation of the wireless communication device 102 for navigation based at least in part on the one or more sets of assistance data obtained. In some embodiments, the method 1000 further includes obtaining an initial set of geographic data for a particular region in which the wireless communication device 102 is located. The initial set of geographic data can indicate whether detailed geographic data for the particular region is available. In some embodiments, the initial set of geographic data can be provided in a tile set form, e.g., having binary values as illustrated by tile set 110 in FIG. 1B. In some embodiments, the method 1000 further includes determining whether to obtain assistance data for navigation based on determining when detailed geographic data for the particular region in which the wireless communication device 102 operates is available. In some embodiments, the method 1000 further includes obtaining a bare-earth altitude model for the particular region in which the wireless communication device 102 is located (operates), obtaining a first-return altitude model for the particular region in which the wireless communication device 102 is located (operates), and calculating an altitude difference model for the region in which the wireless communication device 102 is located (operates) based at least in part on the bare-earth altitude model and the first-return altitude model. In some embodiments, the processing circuitry 802 of the wireless communication device 102 determines whether to obtain assistance data for navigation by determining whether the property of the geographic location in which the wireless communication device 102 is located (operates) is a dense urban region based at least in part on the calculated altitude difference model. The processing circuitry 802 of the wireless communication device 102 can determine a property of the geographic location in which the wireless communication device 102 is located (operates) based on a measured density of wireless local area network (WLAN) access points in the particular region. The processing circuitry 802 of the wireless communication device 102 can also determine a property of the geographic location based on whether the measured density of WLAN access points in the particular region exceeds a WLAN density threshold for a time period exceeding a time threshold. The processing circuitry 802 of the wireless communication device 102 can also determine a property of the geographic location based on whether an altitude difference model indicates an altitude difference in the particular region in which the wireless communication device is located (operates) exceeding an altitude threshold. In some embodiments, the set of criteria indicates a requirement for assistance data for navigation when the wireless communication device 102 loses reception of satellite signals from a minimum number of satellites 824 for a time period exceeding a time threshold. The processing circuitry 802 of the wireless communication device 102 can configure operation of the wireless communication device 102 for navigation by performing one or more operations. The one or more operations can include downloading GPS assistance information for the particular region in which the wireless communication device 102 is located (operates), providing GPS assistance information to a GPS module 814 in the wireless communication device 102, enabling one or more sensors 808 in the wireless communication device 102 to provide information to assist in GPS navigation, setting a duty cycle of the GPS module 814 to operate more frequently or less frequently (depending on a geographic type of the geographic region in which the wireless communication device 102 operates), and setting a map alignment threshold to a wider or narrower area (to assist in modifying display of a location of the wireless communication device to a user thereof).

Figure 11:
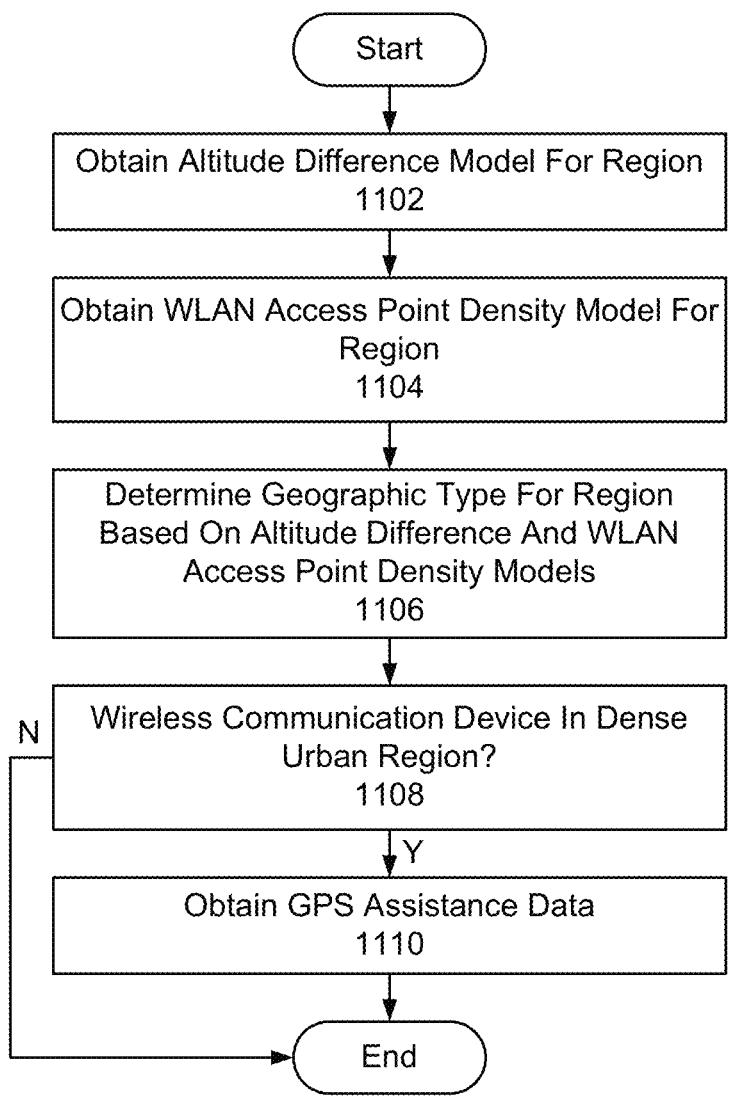
FIG. 11 illustrates another representative method for providing assistance data to a satellite navigation system in a wireless communication device in accordance with some embodiments.

FIG. 11 illustrates another representative method for providing assistance data to a satellite navigation system 814 in a wireless communication device 102 in accordance with some embodiments. In step 1102, processing circuitry 802 in the wireless communication device 102 obtains an altitude difference model for a region in which the wireless communication device 102 operates. In step 1104, the processing circuitry 802 obtains a WLAN access point density model for the region in which the wireless communication device 102 operates. In step 1106, the processing circuitry 802 determines a geographic type for the region in which the wireless communication device 102 operates based at least in part on the altitude difference model and on the WLAN access point density model. In step 1108, the processing circuitry 802 determines whether the wireless communication device 102 operates in a dense urban region. When the wireless communication device 102 is not operating in a dense urban region, the method 1100 ends. When the wireless communication device 102 operates in a dense urban region, in step 1110, the processing circuitry obtains GPS assistance data. In some embodiments, the processing circuitry 802 alters the duty cycle of a GPS module 814 in the wireless communication device 102 when operating in a dense urban region. In some embodiments, the processing circuitry 802 calculates the altitude difference model for the region in which the wireless communication device 102 operates based on a bare-earth altitude model and a first-return altitude model obtained by the processing circuitry 802. In some embodiments, the processing circuitry 802 determines the WLAN access point density model by measuring a number of available WLAN access points in the region in which the wireless communication device operates during a time period. In some embodiments, the processing circuitry obtains the WLAN access point density model by retrieving information from local storage in the wireless communication device or from a remote server through a cellular wireless network. In some embodiments, the processing circuitry 802 controls the wireless communication device 102 to obtain sensor information from one or more sensors contained therein and determines additional GPS assistance data based at least in part on the obtained sensor information. The processing circuitry 802 can also provide at least a portion of the additional GPS assistance data to the GPS module 814 of the wireless communication device 102. In some embodiments, the processing circuitry 802 classifies the geographic type of the region in which the wireless communication device 102 operates based on comparing a measured and/or obtained WLAN access point density to a density threshold value, and on comparing a calculated and/or obtained altitude difference value of the region to an altitude threshold value. In some embodiments, a high value for WLAN AP density and a high value for the altitude difference can correspond to a dense urban region, while a low value for WLAN AP density and a low value for the altitude difference can correspond to an open rural region. In some embodiments, a high value for WLAN AP density and a low value for the altitude difference can correspond to an open suburban region, while a low value for WLAN AP density and a high value for the altitude difference can correspond to a dense rural region.

Figure 12:
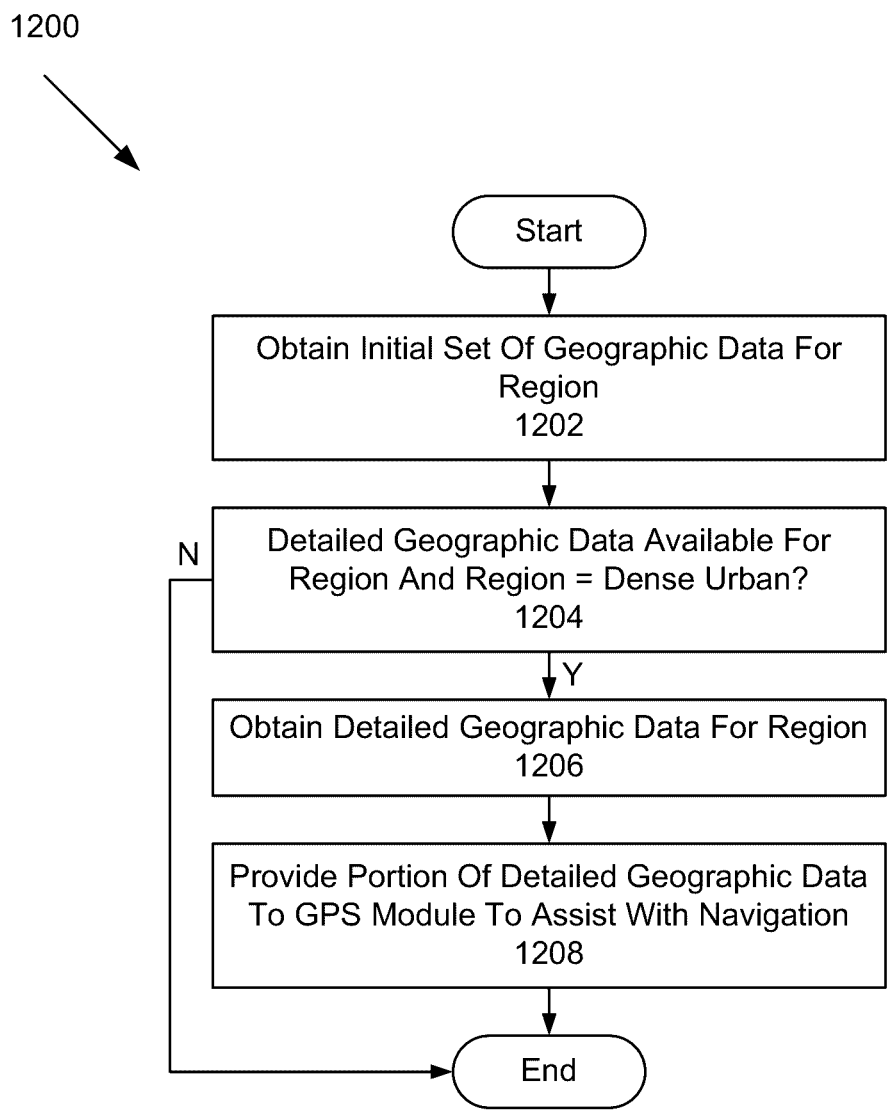
FIG. 12 illustrates a further representative method for providing assistance data to a satellite navigation system in a wireless communication device in accordance with some embodiments.

FIG. 12 illustrates a further representative method for providing assistance data to a satellite navigation system 814 in a wireless communication device 102 in accordance with some embodiments. In step 1202, the processing circuitry 802 of the wireless communication device 102 obtains an initial set of geographic data for a region in which the wireless communication device 102 operates. In step 1204, the processing circuitry 802 of the wireless communication device 102 determines from the initial set of geographic data for the region whether additional detailed geographic data for the region is available and whether the wireless communication device 102 operates in a dense urban region. In step 1206, the processing circuitry 802 of the wireless communication device 102 obtains detailed geographic data for the region. In step 1208, the processing circuitry 802 of the wireless communication device 102 provides at least a portion of the detailed geographic data for the region to a GPS module 814 in the wireless communication device 102 to assist with navigation by the wireless communication device 102.

Representative applications of methods and apparatus according to the present application are described in this section. These examples are provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description provided herein, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

The various aspects, embodiments, implementations or features of the described embodiments can be used separately or in any combination. Various aspects of the described embodiments can be implemented by software, hardware, or by a combination of hardware and software. The described embodiments can also be embodied as computer readable code on a non-transitory computer readable medium. The non-transitory computer readable medium is any data storage device that can store data and can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless communication device, comprising:
a global positioning system (GPS) module configured to receive global navigation satellite system (GNSS) signals and to determine a GPS position of the wireless communication device based at least in part on received GNSS signals; and
processing circuitry coupled to the GPS module, the processing circuitry configured to control the wireless communication device to at least:
  obtain an altitude difference model for a region in which the wireless communication device operates;
  obtain a wireless local area network (WLAN) access point density model for the region;
  determine a geographic type for the region based at least in part on a comparison of the altitude difference model to an altitude threshold and a comparison of the WLAN access point density model to a density threshold; and
  obtain GPS assistance data when the geographic type for the region in which the wireless communication device operates is determined to be a dense urban region.

2. The wireless communication device of claim 1, wherein the processing circuitry is further configured to control the wireless communication device to:
alter a duty cycle of operation of the GPS module when the wireless communication device operates in the dense urban region.

3. The wireless communication device of claim 1, wherein the processing circuitry is further configured to control the wireless communication device to:
obtain a bare-earth altitude model for the region in which the wireless communication device operates;
obtain a first-return altitude model for the region in which the wireless communication device operates; and
calculate the altitude difference model for the region in which the wireless communication device operates based at least in part on the bare-earth altitude model and the first-return altitude model.

4. The wireless communication device of claim 1, wherein the processing circuitry of the wireless communication device obtains the WLAN access point density model by measuring a number of available WLAN access points in the region in which the wireless communication device operates during a time period.

5. The wireless communication device of claim 1, wherein the processing circuitry of the wireless communication device obtains the WLAN access point density model by retrieving information from local storage in the wireless communication device or from a remote server through a cellular wireless network.

6. The wireless communication device of claim 1, wherein the processing circuitry is further configured to control the wireless communication device to:
obtain sensor information from one or more sensors in the wireless communication device;
determine additional GPS assistance data based at least in part on the sensor information; and
provide the additional GPS assistance data to the GPS module.

7. The wireless communication device of claim 1, wherein the processing circuitry is configured to control the wireless communication device to obtain GPS assistance data when the wireless communication device operates in the dense urban region by downloading GPS assistance information for the region in which the wireless communication device operates from an external wireless network.

8. The wireless communication device of claim 1, wherein the processing circuitry is configured to determine the geographic type for the region in which the wireless communication device operates by classifying the region as one of: dense urban, open suburban, dense rural, or open rural.

9. The wireless communication device of claim 8, wherein the geographic type for the region in which the wireless communication device operates is classified as dense urban when the altitude difference model indicates an altitude difference in the region exceeds the altitude threshold and the WLAN access point density model indicates the WLAN access point density in the region exceeds the density threshold.

10. The wireless communication device of claim 8, wherein the geographic type of the region in which the wireless communication device operates is classified as open rural when the altitude difference model indicates an altitude difference in the region falls below the altitude threshold and the WLAN access point density model indicates the WLAN access point density in the region falls below the density threshold.

11. A method to provide assistance data to a satellite navigation system in a wireless communication device, the method comprising:
determining a geographic type for a region in which the wireless communication device is located based at least in part on a comparison of an altitude difference model for the region to an altitude threshold and a comparison of a wireless local area network (WLAN) access point density model for the region to a density threshold;
determining whether to obtain assistance data for navigation by the wireless communication device based on the geographic type for the region and on a set of criteria including one or more of: a satellite signal quality estimate measured by the wireless communication device or a user setting of the wireless communication device;

when the geographic type for the region and the set of criteria indicates a requirement for assistance data for navigation, obtaining one or more sets of assistance data; and configuring operation of the wireless communication device for navigation by the satellite navigation system based at least in part on the one or more sets of assistance data.

12. The method of claim 11, further comprising:

obtaining an initial set of geographic data for the region in which the wireless communication device is located, the initial set of geographic data indicating whether detailed geographic data for the region is available; and wherein determining whether to obtain assistance data for navigation comprises determining whether detailed geographic data for the region is available.

13. The method of claim 12, wherein the detailed geographic data for the region includes a characterization of geographic properties of the region as one or more of: open rural, dense rural, dense urban, or open suburban.

14. The method of claim 13, wherein the region is characterized as a dense urban region, and wherein configuring operation of the wireless communication device for navigation comprises one or more of:

downloading GPS assistance information for the region;
providing GPS assistance information to a GPS module;
enabling one or more sensors to assist in navigation;
setting a duty cycle of the GPS module to operate more frequently, or
setting a map alignment threshold to a wider geographic area.

15. The method of claim 11, further comprising:

obtaining a bare-earth altitude model for the region in which the wireless communication device is located;
obtaining a first-return altitude model for the region in which the wireless communication device is located; and
calculating the altitude difference model for the region in which the wireless communication device is located based at least in part on the bare-earth altitude model and the first-return altitude model.

16. The method of claim 11, wherein the WLAN access point density model is based on a measured density of WLAN access points in the region.

17. The method of claim 16, wherein the geographic type for the region comprises a dense urban region when the measured density of WLAN access points in the region exceeds the density threshold for a time period exceeding a time threshold.

18. The method of claim 15, wherein the geographic type for the region comprises a dense urban region when the altitude difference model indicates an altitude difference in the region exceeds the altitude threshold.

19. A non-transitory computer readable storage medium storing instructions that, when executed by a processor in a wireless communication device, cause the wireless communication device to:

determine a geographic type for a region in which the wireless communication device is located based at least in part on a comparison of an altitude difference model for the region to an altitude threshold and a comparison of a wireless local area network (WLAN) access point density model for the region to a density threshold;

obtain an initial set of geographic data for a region in which the wireless communication device operates;

determine from the initial set of geographic data for the region whether additional detailed geographic data for the region is available;

obtain the detailed geographic data for the region when available and the wireless communication device operates in a dense urban region; and provide at least a portion of the detailed geographic data for the region to a global positioning system (GPS) module in the wireless communication device to assist with navigation by the wireless communication device.

* * * * *